(12) United States Patent
Golden et al.

(10) Patent No.: US 7,785,551 B2
(45) Date of Patent: *Aug. 31, 2010

(54) AMMONIA SCR CATALYST AND METHOD OF USING THE CATALYST

(75) Inventors: Stephen J. Golden, Santa Barbara, CA (US); Svetlana Iretskaya, Paris (FR)

(73) Assignee: Catalytic Solutions, Inc., Ventura, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/313,501

(22) Filed: Nov. 20, 2008

(65) Prior Publication Data

US 2009/0081098 A1 Mar. 26, 2009

Related U.S. Application Data

(63) Continuation of application No. 11/651,290, filed on Jan. 9, 2007, now Pat. No. 7,527,776.

(51) Int. Cl.
*B01D 53/56* (2006.01)
*B01J 23/00* (2006.01)
*B01J 23/10* (2006.01)
*B01J 23/34* (2006.01)
*B01J 23/26* (2006.01)
*B01J 23/74* (2006.01)
*B01J 23/72* (2006.01)

(52) U.S. Cl. .......... 423/239.1; 423/239.2; 502/300; 502/345; 502/319; 502/325; 502/324; 502/353; 502/304; 502/302; 502/340; 502/527.12

(58) Field of Classification Search .......... 423/239.1, 423/239.2; 502/300, 345, 319, 325, 324, 502/353, 304, 302, 340, 527.12
See application file for complete search history.

(56) References Cited

U.S. PATENT DOCUMENTS 4,004,875 A 1/1977 Zink et al.

(Continued)

FOREIGN PATENT DOCUMENTS

WO 2006044764 4/2006
WO 2008085265 7/2008

OTHER PUBLICATIONS

Eranen, et al., "Enhancement of the catalytic activity of Cu-ZSM-5 for nitric oxide decomposition by introduction of copper during the zeolite synthesis," Applied Catalysis B: Environmental, vol. 4, 1994, pp. 213-223.

(Continued)

*Primary Examiner*—Timothy C Vanoy
(74) *Attorney, Agent, or Firm*—William J. McNichol, Jr.; Reed Smith LLP (57) ABSTRACT

A catalyst and a method for selectively reducing nitrogen oxides with ammonia are provided. The catalyst includes a first component of copper, chromium, cobalt, nickel, manganese, iron, niobium, or mixtures thereof, a second component of cerium, a lanthanide, a mixture of lanthanides, or mixtures thereof, and a zeolite. The catalyst may also include strontium as an additional second component. The catalyst selectively reduces nitrogen oxides to nitrogen with ammonia at low temperatures. The catalyst has high hydrothermal stability. The catalyst has high activity for conversion of nitrogen oxides in exhaust streams, and are not significantly influenced by the $NO/NO_2$ ratio. The catalyst and the method may have special application to selective reduction of nitrogen oxides in exhaust gas from diesel vehicles, although the catalyst and the method have broad application to a wide range of gas streams that contain nitrogen oxides.

12 Claims, 5 Drawing Sheets

U.S. PATENT DOCUMENTS

| | | | |
|---|---|---|---|
| 4,160,805 | A | 7/1979 | Inaba et al. |
| 4,510,265 | A | 4/1985 | Hartwig |
| 4,759,918 | A | 7/1988 | Homeier et al. |
| 4,833,113 | A | 5/1989 | Imanari et al. |
| 4,900,517 | A | 2/1990 | Domesle et al. |
| 4,912,776 | A | 3/1990 | Alcorn |
| 4,961,917 | A | 10/1990 | Byrne |
| 5,100,632 | A | 3/1992 | Dettling et al. |
| 5,413,699 | A | 5/1995 | Chou |
| 5,505,919 | A | 4/1996 | Morii et al. |
| 5,589,147 | A * | 12/1996 | Farnos et al. ............. 423/239.2 |
| 5,681,788 | A | 10/1997 | Kanesaka et al. |
| 5,840,649 | A * | 11/1998 | Ichiki et al. .................. 502/324 |
| 5,900,222 | A | 5/1999 | Ito et al. |
| 5,911,956 | A | 6/1999 | Viel Lamare et al. |
| 5,964,908 | A | 10/1999 | Malina |
| 5,988,115 | A | 11/1999 | Anderson et al. |
| 6,013,599 | A | 1/2000 | Manson |
| 6,089,855 | A | 7/2000 | Becker et al. |
| 6,284,211 | B1 | 9/2001 | Miyadera et al. |
| 6,383,463 | B1 | 5/2002 | Mochida et al. |
| 6,485,289 | B1 | 11/2002 | Kelly et al. |
| 6,609,483 | B1 | 8/2003 | Albrecht et al. |
| 6,677,264 | B1 | 1/2004 | Klein et al. |
| 6,756,336 | B2 | 6/2004 | Kasahara et al. |
| 6,780,805 | B2 | 8/2004 | Faber et al. |
| 6,971,336 | B1 | 12/2005 | Chojnacki et al. |
| 7,084,086 | B2 | 8/2006 | Kasahara et al. |
| 7,527,776 | B2 | 5/2009 | Golden et al. |
| 2001/0022956 | A1 | 9/2001 | Okamoto et al. |
| 2002/0016259 | A1 * | 2/2002 | Yoshikawa .................. 502/324 |
| 2003/0083193 | A1 | 5/2003 | Takaya et al. |
| 2005/0159304 | A1 | 7/2005 | Ichiki et al. |
| 2006/0021910 | A1 | 2/2006 | Yaluris et al. |
| 2006/0029535 | A1 * | 2/2006 | Ott .......................... 423/239.2 |
| 2006/0039843 | A1 | 2/2006 | Patchett et al. |
| 2006/0120936 | A1 * | 6/2006 | Alive et al. ............. 423/215.5 |
| 2006/0155102 | A1 | 7/2006 | Lindall et al. |
| 2006/0159607 | A1 | 7/2006 | Ott |
| 2006/0182676 | A1 | 8/2006 | Tran et al. |
| 2006/0217579 | A1 | 9/2006 | Bailey |
| 2006/0228283 | A1 | 10/2006 | Malyala et al. |
| 2007/0180760 | A1 | 8/2007 | Zhou et al. |
| 2007/0269359 | A1 | 11/2007 | Fisher et al. |

OTHER PUBLICATIONS

Li, et al., "Selective catalytic reduction of nitric oxide by methane over cerium and silver ion-exchanged ZSM-5 zeolites," Applied Catalysis A: General, vol. 165, 1997, pp. 15-34.

Meunier, et al., "Mechanistic differences in the selective reduction of NO by propene over cobalt- and silver-promoted alumina catalysts: kinetic and in situ DRIFTS study," Catalysis Today, vol. 59, 2000, pp. 287-304.

Miyadera, "Selective reduction of $NO_x$ By ethanol on catalysts composed of $Ag/Al_2O_3$ and $Cu/TiO_2$ without formation of harmful by-products," Applied Catalysis B: Environmental, vol. 16, 1998, pp. 155-164.

Flytzani-Stephanopoulos, et al., "Direct Catalytic Decomposition of Nitric Oxide," prepared for U.S. Department of Energy, Jun. 15, 1995.

Yang, et al., "Ion-exchanged pillared clays for selective catalytic reduction of NO By ethylene in the presence of oxygen," Applied Catalysis B: Environmental, vol. 19, 1998, pp. 289-304.

Maaskant for CRI/Criterion Catalyst Co., "The Shell Denox System (SDS) for Nitric Acid Plants," Nitrogen 2005. Bucharest, Romania.

Maaskant for CRI Catalyst Company - Environmental Catalyst And Systems, "The Shell System for NOx Removal and Dioxin Destruction from Incineration Flue Gas," 3rd International Symposium on Incineration and Flue Gas Treatment Technologies, Jul. 2001, Brussels.

Lee, et al., Evaluation of Cu-Based SCR/DPF Technology for Diesel Exhaust Emission Control, SAE Paper 2008-01-0072, SAE International 2008, pp. 75-80.

* cited by examiner

AMMONIA SCR CATALYST AND METHOD OF USING THE CATALYST

RELATED APPLICATIONS

This application is a continuation application of U.S. application Ser. No. 11/651,290, filed Jan. 9, 2007, now U.S. Pat. No. 7,527,776, issued on May 5, 2009, which is herein incorporated by reference.

FIELD OF THE INVENTION

The invention relates to a catalyst and a method for selective catalytic reduction of nitrogen oxides with ammonia at low temperatures.

BACKGROUND

Diesel engines normally operate at air to fuel ratios above stoichiometric. Emissions of nitrogen oxides and particulates from diesel-fueled vehicles may be significant. Emissions from diesel vehicles are subject to regulation in both the United States and Europe.

Nitrogen oxides are also present in exhaust gases from stationary sources such as power plants, industrial processes, gas turbines, etc.

One method of removing $NO_x$ in exhaust gas is to contact the exhaust stream with a reductant such as ammonia in the presence of a catalyst at elevated temperature. The catalyzed reaction of the reductant with $NO_x$ is referred to as selective catalytic reduction (SCR). Urea, ammonium hydroxide, ammonium formate, and other nitrogen-containing chemicals can also be used as a source of ammonia.

Traditional ammonia SCR catalysts are based on vanadia/titania. Imanari, et al. (U.S. Pat. No. 4,833,113), for example, describe an SCR catalyst comprising an oxide of titanium, an oxide of tungsten, and an oxide of vanadium. Vanadia/titania ammonia SCR catalysts normally operate at a temperature of approximately 250-370° C. Exhaust gas from light duty diesel vehicles is normally at a temperature of approximately 200° C. or less. Vanadia/titania SCR catalysts do not have significant activity at temperatures as low as 200° C.

Byrne (U.S. Pat. No. 4,961,917, assigned to Engelhard Corporation) disclose a method of passing ammonia, nitrogen oxides, and oxygen over iron or copper-promoted zeolite catalysts to selectively catalyze the reduction of the nitrogen oxides. The fresh copper-promoted catalyst has good activity. However, the copper catalyst deactivates significantly when aged. Although the iron catalyst is far more stable than the copper catalyst, it has maximum activity at about 350-500° C., significantly higher than the 200° C. temperatures that occur in many diesel exhaust streams.

There is a need for ammonia SCR catalysts that are stable toward aging and that are active at lower temperatures than conventional ammonia SCR catalysts.

SUMMARY OF THE INVENTION

The present invention is a method for selective reduction of nitrogen oxides in a gas stream with ammonia by contacting the gas stream with ammonia in the presence of a catalyst with a first component comprising at least one of the group consisting of copper, chromium, cobalt, nickel, manganese, iron, niobium, and mixtures thereof; a second component comprising at least one of the group consisting of cerium, a lanthanide, a mixture of lanthanides, and mixtures thereof; and at least one zeolite.

In one embodiment, a catalyst for selective catalytic reduction of nitrogen oxides with ammonia comprises a first component comprising at least one of the group consisting of copper, chromium, cobalt, nickel, manganese, iron, niobium, and mixtures thereof; a second component comprising at least one of the group consisting of cerium, a lanthanide, a mixture of lanthanides, and mixtures thereof; and at least one zeolite.

Lanthanides are defined to mean Y, La, Pr, Nd, Sm, Eu, Gd, Ho or Yb.

In another embodiment, a catalyst for selective catalytic reduction of nitrogen oxides with ammonia comprises a first component comprising at least one of the group consisting of copper, chromium, cobalt, nickel, manganese, iron, niobium, and mixtures thereof; a second component comprising at least one of the group consisting of cerium, a lanthanide, a mixture of lanthanides, and mixtures thereof; and at least one zeolite, and no other material which functions as a catalyst for the reduction of nitrogen oxides with ammonia.

DETAILED DESCRIPTION

Exhaust gas from motor vehicles and engines such as gas turbines contains nitrogen oxides. The nitrogen oxides in the exhaust gas can be removed by contacting the exhaust gas with reducing agents such as ammonia in the presence of a selective catalytic reduction (SCR) catalyst. The ammonia or other reducing agent reacts with the nitrogen oxides to form nitrogen and water.

Water vapor in the exhaust gas can deactivate the SCR catalyst, lowering the $NO_x$ conversion. Hydrothermal stability of the SCR catalyst is therefore important.

The exhaust gas from light duty diesel engines is at low temperature, approximately 200° C. Low temperature activity of the SCR catalyst is therefore important for diesel engine applications. The SCR catalysts according to embodiments of the present invention have good $NO_x$ conversion activity at low temperatures.

According to Alcorn (U.S. Pat. No. 4,912,726), it is believed that the reduction of NO requires the presence of oxygen, while the reduction of $NO_2$ does not. Alcorn also asserts that the reduction of $NO_2$ is easier to carry out than the reduction of NO.

Alcorn states that the evidence seems to support a two-step process for the ammonia-SCR process, where the following reactions occur in parallel:

$$NO + \tfrac{1}{2}O_2 \rightarrow NO_2$$

$$6NO_2 + 8NH_3 \rightarrow 7N_2 + 12H_2O$$

It is well-known that SCR catalysts have lower activity for $NO_x$ conversion at high $NO/NO_2$ ratios than at low ratios. Only about 5% of the $NO_x$ in diesel offgas is $NO_2$. Low temperature activity of the SCR catalyst at high $NO/NO_2$ ratios is therefore an important factor for diesel applications.

Although the $NO/NO_2$ ratio can be lowered by oxidizing the NO in the exhaust gas to $NO_2$ with a diesel oxidation catalyst (DOC), DOC catalysts may not be effective at converting NO to $NO_2$ under the low temperature conditions that may be seen in diesel exhaust. Further, DOC catalysts are often based on platinum and can be expensive. Finally, the DOC may lose its ability to convert NO to $NO_2$ at low temperatures over time due to aging and/or poisoning.

As shown in the examples below, the SCR catalysts according to embodiments of the present invention have higher activity at low temperatures than the catalysts of the prior art at both high and low $NO/NO_2$ ratios. The SCR catalysts of the present invention also have higher hydrothermal stability than the catalysts of the prior art. Diesel exhaust normally contains a significant amount of water. Hydrothermal stability is therefore a major factor for diesel applications.

The catalysts of the present invention comprise: a first component comprising at least one of the group consisting of copper, chromium, cobalt, nickel, manganese, iron, niobium, and mixtures thereof; a second component comprising at least one of the group consisting of cerium, a lanthanide, a mixture of lanthanides, and mixtures thereof; and at least one zeolite. The catalysts may optionally further comprise strontium as an additional second component. The catalysts may also preferably comprise an oxygen storage material ("OSM"). Oxygen storage materials may generally be cerium oxide-based materials, as described in more detail below.

As shown in the Examples below, the first component and the second component of the catalysts according to embodiments of the present invention may have a synergistic effect on one another. The synergistic effect may help to provide high $NO_x$ conversion at low temperature and high $NO/NO_2$ ratios. The synergy between the first component and the second component may also help to stabilize the catalysts toward hydrothermal aging. The optional strontium additional second component may further enhance the NO conversion of the catalysts according to embodiments of the present invention.

First Component

The first component of the catalyst according to embodiments of the present invention may comprise at least one of copper, chromium, cobalt, nickel, manganese, iron, niobium, and mixtures thereof. Manganese is an exemplary first component.

The catalyst of the present invention may comprise approximately 1 to approximately 20 weight percent of the first component, more preferably approximately 3 to approximately 15 weight percent of the first component, and most preferably approximately 5 to approximately 8 weight percent of the first component, where the weight percent of the first component is calculated on the basis of the metal.

Second Component

The second component of the catalyst according to embodiments of the present invention may comprise at least one component selected from the group consisting of cerium, a lanthanide, a mixture of lanthanides, and mixtures thereof. Cerium is an exemplary second component.

The catalyst of the present invention may comprise approximately 2 to approximately 35 weight percent of the second component, more preferably approximately 5 to approximately 25 weight percent of the second component, and most preferably approximately 8 to approximately 15 weight percent of the second component, where the weight percentage of the second component is calculated on the basis of the metal.

Strontium Component

The catalyst according to embodiments of the present invention may also comprise a strontium second component in addition to, or as a partial replacement for, the second component selected from the group consisting of cerium, a lanthanide, a mixture of lanthanides, and mixtures thereof.

If the catalyst according to embodiments of the present invention comprises a strontium second component, the catalyst may comprise approximately 2 to approximately 35 weight percent of the strontium second component, more preferably approximately 5 to approximately 25 weight percent of the strontium second component, and most preferably approximately 8 to approximately 15 weight percent of the strontium second component, where the weight percent of the strontium second component is on the basis of strontium metal.

Zeolite

The catalyst according to embodiments of the present invention may comprise at least one zeolite. The zeolite may be selected from the group consisting of ZSM-5, zeolite beta, a ZSM-type zeolite, a MCM-type zeolite, mordenite, faujasite, ferrierite, and mixtures thereof. In an embodiment, the zeolite may be selected from the group consisting of ZSM-5, ZSM-11, ZSM-12, ZSM-18. ZSM-23, a MCM-zeolite, zeolite beta, and mixtures thereof. ZSM-5 may be an exemplary zeolite for use as a component in the catalysts according to embodiments of the present invention.

The zeolite or mixture of zeolites may be in the H-form, the Na-form, the ammonium-form, or mixtures thereof. The H-form of the zeolite may be an exemplary form of the zeolite or mixture of zeolites.

The zeolite may also be exchanged, all or in part, with the first component and/or the second component. The $SiO_2/Al_2O_3$ ratio of the zeolite may be in a range of approximately 1 to approximately 500, more preferably approximately 10 to approximately 150, and most preferably approximately 30 to approximately 70. Although not wishing to be bound by a theory, it is believed that zeolites having a $SiO_2/Al_2O_3$ ratio greater than approximately 10 may be beneficial in enhancing the hydrothermal stability of the catalysts. A $SiO_2/Al_2O_3$ ratio of approximately 40 may be an exemplary ratio.

In an embodiment, all or part of the first component, the second component, or both the first component and the second component may be impregnated or exchanged into the zeolite or mixture of zeolites. In an embodiment, part of the first component and/or the second component may be exchanged into the zeolite or mixture of zeolites, and part of the first component and/or the second component may be impregnated into the zeolite or mixture of zeolites.

The catalyst may comprise approximately 10 to 90 weight percent zeolite, more preferably approximately 20 to approximately 90 weight percent zeolite, and most preferably approximately 40 to approximately 80 weight percent zeolite. The zeolite may also be a mixture of zeolites Oxygen Storage Material An oxygen storage material may be an optional component of the catalyst according to embodiments of the present invention. It is generally preferred that the catalysts of the present invention comprise at least one oxygen storage material. Oxygen storage materials may generally comprise a cerium-oxide-based material. Oxygen storage materials can take up oxygen from oxygen-rich feed streams and give up oxygen to oxygen-deficient feedstreams. The oxygen storage material may also be a support for the first component and/or the second component.

The total surface area of cerium oxide-based materials may generally decrease when the cerium oxide-based materials are heated to temperatures of 800° C. or more. One or more metal oxides may be added to the cerium oxide-based material to decrease the degree of sintering of the cerium oxide-based material during exposure to high temperatures. The preferred metal oxides that can be added to the cerium oxide-based materials may be, for example, one or more of $ZrO_2$, $Al_2O_3$, $La_2O_3$, or other rare earth metal oxide. Rare earth metals are defined as scandium and yttrium and the elements with atomic numbers 57 through 71. In one embodiment of the present invention, the oxygen storage material may be a cerium oxide-based material having a composition with the formula $Ce_{1-a}Zr_aO_2$ or $Ce_{1-c-d}Zr_cLan_dO_2$, where Lan is at least one of Y, La, Pr, Nd, Sm, Eu, Gd, Ho, or Yb.

In an exemplary embodiment, the oxygen storage material in the catalyst according to the present invention may have a formula of $Ce_{0.24}Zr_{0.66}La_{0.04}Y_{0.06}O_2$ (CZLY), $Ce_{0.24}Zr_{0.67}Ln_{0.09}O_2$ (CZL), $Ce_{0.68}Zr_{0.32}O_2$ (CZO), or $Ce_{0.24}Zr_{0.67}Nd_{0.09}O_2$ (CZN). Other oxygen storage materials may also be suitable.

If the catalyst according to embodiments of the present invention comprises at least one oxygen storage material, the catalyst may comprise approximately 10 to approximately 90 weight percent oxygen storage material, more preferably approximately 20 to approximately 70 weight percent oxygen storage material, and most preferably approximately 30 to approximately 60 weight percent oxygen storage material. The weight percent of the oxygen storage material is on the basis of the oxides.

Although not wishing to be limited to a theory, it is believed that the oxygen storage material may enhance the performance of the catalysts according to embodiments of the present invention by improving the ability of the catalyst to oxidize NO to $NO_2$. $NO_2$ may react more rapidly with ammonia or other reducing agent than does NO. Enhancing the ability of the catalyst to oxidize NO to $NO_2$ may therefore improve the activity of the catalyst to catalyze the selective reduction of $NO_x$ with ammonia. The oxygen storage material may also improve the rheology of aqueous slurries for the optional washcoat (described below) that comprise the oxygen storage material.

Inorganic Oxides

The catalyst according to embodiments of the present invention may also comprise at least one inorganic oxide selected from the group consisting of alumina, silica, titania, silica-alumina, and solid solutions, composites, or mixtures thereof. Alumina is an exemplary inorganic oxide for use in the catalyst according to embodiments of the present invention. The inorganic oxides may be used, for example, as part of a washcoat, as described below. The inorganic oxides may be substituted for all or part of the oxygen storage material component. In an embodiment, the sum of the amount of oxygen storage material and the amount of inorganic oxide may be an amount as previously given for the oxygen storage material alone. The other inorganic oxides may be substituted, all or in part, for the oxygen storage material, although the inorganic oxides may have a different function than the oxygen storage material. Inorganic oxides may improve the rheology of aqueous slurries for the optional washcoat and enhance wash-coat adhesion to a substrate, if the catalyst is to be coated on a monolith.

Shaped Catalyst

In an embodiment, the catalyst of the present invention may be molded into a suitable shape such as a honeycomb, pellets, or beads. In another embodiment, the catalyst may be extruded into extrudates.

In an embodiment, the catalyst according to embodiments of the present invention may be formed by milling or mulling at least one of: the first component comprising at least one of the group consisting of oxides or salts or other compounds of copper, chromium, cobalt, nickel, manganese, iron, niobium, and mixtures thereof; the second component comprising at least one of the group consisting of cerium, a lanthanide, a mixture of lanthanides, and mixtures thereof; and the at least one zeolite to form a paste. The optional oxygen storage material and/or the optional strontium second component may also be milled or mulled with any or all of the other components. The remaining components of the catalyst may be added by methods well known to those skilled in the art.

The paste may be extruded through a die to form extrudates. The extrudates may be dried and calcined, thereby forming the catalyst. Other manners of forming shaped catalysts may also be suitable.

Catalyst Composition

Advantageously, the catalyst according to embodiments of the present invention may be combined with a substrate to form a catalyst composition. Accordingly, another aspect of the present invention provides a catalyst composition that comprises:

(a) a substrate;
(b) a catalyst comprising:
   a first component comprising at least one of the group consisting of copper, manganese, iron, chromium, cobalt, nickel, niobium, and mixtures thereof;
   a second component comprising at least one of the group consisting of cerium, a lanthanide, a mixture of lanthanides, and mixtures thereof; and
   at least one zeolite.

The catalyst may optionally further comprise at least one oxygen storage material and/or strontium as an additional second component. The catalyst may optionally further comprise an inorganic oxide selected from the group consisting of alumina, silica, titania, silica-alumina, and solid solutions, composites, or mixtures thereof. The inorganic oxide may be part of a washcoat, or the inorganic oxide may be separate from the washcoat. In an exemplary embodiment, the inorganic oxide may be part of the washcoat.

Substrate

As used herein, a substrate may be any support structure known in the art for supporting catalysts. In one embodiment of the present invention, the substrate may be in the form of beads or pellets. The beads or pellets may be formed from alumina, silica alumina, silica, titania, mixtures thereof, or any suitable material. In an exemplary embodiment of the present invention, the substrate may be a honeycomb support. The honeycomb support may be a ceramic honeycomb support or a metal honeycomb support. The ceramic honeycomb support may be formed, for example, from sillimanite, zirconia, petalite, spodumene, magnesium silicates, mullite, alumina, cordierite ($Mg_2Al_4Si_5O_{18}$), other alumino-silicate materials, silicon carbide, or combinations thereof. Other ceramic supports may also be suitable.

If the support is a metal honeycomb support, the metal may be a heat-resistant base metal alloy, particularly an alloy in which iron is a substantial or major component. The surface of the metal support may be oxidized at elevated temperatures above about 1000° C. to improve the corrosion resistance of the alloy by forming an oxide layer on the surface of the alloy. The oxide layer on the surface of the alloy may also enhance the adherence of a washcoat to the surface of the monolith support. Preferably, all of the substrate supports, either metallic or ceramic, offer a three-dimensional support structure.

In one embodiment of the present invention, the substrate may be a monolithic carrier having a plurality of fine, parallel flow passages extending through the monolith. The passages can be of any suitable cross-sectional shapes and sizes. The passages may be, for example, trapezoidal, rectangular, square, sinusoidal, hexagonal, oval, or circular, although other shapes are also suitable. The monolith may contain from about 9 to about 1200 or more gas inlet openings or passages per square inch of cross section, although fewer passages may be used.

The substrate can also be any suitable filter for particulates. Some suitable forms of substrates may include woven filters, particularly woven ceramic fiber filters, wire meshes, disk filters, ceramic honeycomb monoliths, ceramic or metallic foams, wall flow filters, and other suitable filters. Wall flow filters are similar to honeycomb substrates for automobile exhaust gas catalysts. They may differ from the honeycomb substrates that may be used to form normal automobile exhaust gas catalysts in that the channels of the wall flow filter may be alternately plugged at an inlet and an outlet so that the exhaust gas is forced to flow through the porous walls of the wall flow filter while traveling from the inlet to the outlet of the wall flow filter.

Washcoat

In an embodiment, at least a portion of the catalyst of the present invention may be placed on the substrate in the form of a washcoat. The term "washcoat," as used herein, refers to a coating of oxide solids on the substrate or solid support structure. The oxide solids in the washcoat may be one or more carrier material oxides, one or more catalyst oxides, or a mixture of carrier material oxides and catalyst oxides. Carrier material oxides are porous solid oxides that may be used to provide a high surface area for a dispersed phase. Carrier materials are normally stable at high temperatures and under a range of reducing and oxidizing conditions. The zeolite and the oxygen storage material may be oxide solids. The inorganic oxide may also be an oxide solid.

In an embodiment, a washcoat may be formed on the substrate by suspending the carrier materials in water to form an aqueous slurry and placing (placing includes but is not limited to depositing, adhering, curing, coating, and any known coating processes to coat a film on a substrate) the aqueous slurry on the substrate as a washcoat. The carrier materials in the slurry may comprise the zeolite or the zeolite and the oxygen storage material. In an exemplary embodiment, the oxide solids that comprise the washcoat may comprise optionally the zeolite and/or the oxygen storage material. In an another embodiment the washcoat may further comprise at least one inorganic oxide selected from the group consisting of alumina, silica, titania, silica-alumina, and solid solutions, composites, and mixtures thereof.

Other components such as salts of the first and/or the second components may optionally be added to the aqueous slurry. Other components such as acid or base solutions or various salts or organic compounds may be added to the aqueous slurry to adjust the rheology of the slurry. Some examples of compounds that can be used to adjust the rheology include, but are not limited to ammonium hydroxide, aluminum hydroxide, acetic acid, citric acid, tetraethylammonium hydroxide, other tetraalkylammonium salts, ammonium acetate, ammonium citrate, glycerol, commercial polymers such as polyethylene glycol, and other suitable polymers.

In an embodiment, the first component, the second component, or both the first component and the second component may be added to the aqueous slurry as oxides or other compounds, for example nitrates, acetates or other salts and/or mixture of thereof. The slurry may be placed on the substrate in any suitable manner. For example, the substrate may be dipped into the slurry, or the slurry may be sprayed onto the substrate. Other methods of depositing the slurry onto the substrate known to those skilled in the art may be used in alternative embodiments. If the substrate is a monolithic carrier with parallel flow passages, the washcoat may be formed on the walls of the passages. Gas flowing through the flow passages may contact the washcoat on the walls of the passages as well as materials that are supported on the washcoat.

It is believed that the oxygen storage material may improve the rheology of the washcoat slurry. Such improvement may be seen in process control and/or manufacture of the catalyst. The enhanced rheology of the washcoat slurry that may be due to the presence of the oxygen storage material may enhance the adhesion of the washcoat slurry to the substrate.

In an embodiment of the present invention, a washcoat may be formed by slurry depositing the zeolite and optionally the oxygen storage material onto the substrate. The washcoat may also comprise at least one inorganic oxide selected from the group consisting of alumina, silica, titania, silica-alumina, and solid solutions, composites, and mixtures thereof. A solution comprising water-soluble precursor salts of the first component and/or the second component and/or the optional strontium-second component may be impregnated and/or exchanged into the washcoat after the washcoat is placed on the substrate. In an alternative embodiment, salts of the first and/or the second component and/or the optional strontium second component may be added to the aqueous slurry for the washcoat. In yet another embodiment, at least one of the first component, the second component, and/or the optional strontium second component may be added to the aqueous slurry for the washcoat as oxides.

The substrate, the washcoat, and the impregnated or exchanged solution (comprising water-soluble precursor salts of the first component and/or the second component and/or the optional strontium-second component) may be calcined to form the catalyst composition before or after the washcoat and/or the solution are added to the substrate. In an embodiment, the washcoat and the impregnated or exchanged solution may be dried before calcining.

Method for Removing $NO_x$

The exhaust gas may be contacted with the catalyst according to embodiments of the present invention in the presence of ammonia sufficient to reduce the $NO_x$ that is contained in the exhaust gas. The ammonia may normally be introduced into the exhaust gas before the exhaust gas contacts the catalyst according to an embodiment of the present invention. The exhaust gas and the ammonia as a reducing agent may be contacted with the catalyst, thereby reducing the nitrogen oxides in the exhaust gas.

Urea, ammonium hydroxide, ammonium formate, ammonia gas, or any other suitable source of ammonia may be used as a source of ammonia.

The ammonia/$NO_x$ mole ratio may be in a range of approximately 0.3 to approximately 2.5, more preferably in a range of approximately 0.7 to approximately 2, and most preferably in a range of approximately 0.8 to approximately 1.2. Low ammonia/$NO_x$ ratios may generally be preferred in order to minimize excess ammonia in the exhaust gas. Excess ammonia in the exhaust gas may be undesirable due to health or odor issues.

The space velocity of the exhaust gas and the ammonia passing through the catalyst may be in a range of approximately 5,000 $hr^{-1}$ to approximately 180,000 $hr^{-1}$, more preferably in a range of approximately 15,000 $hr^{-1}$ to approximately 90,000 $hr^{-1}$, and most preferably in a range of approximately 20,000 $hr^{-1}$ to approximately 60,000 $hr^{-1}$.

The exhaust gas and ammonia may be contacted with the catalyst at a temperature of approximately 140° C. to approximately 700° C., more preferably at a temperature of approximately 150° C. to approximately 600° C., and most preferably at a temperature of approximately 170° C. to approximately 500° C.

If the temperature of the exhaust gas is lower than approximately 170° C., the reduction of the nitrogen oxides may be low. At temperatures greater than approximately 400° C., the ammonia may be oxidized. If the ammonia is oxidized, there may be insufficient ammonia reducing agent in the exhaust gas to reduce the nitrogen oxides.

If excess ammonia is present in the exhaust gas, at least a portion of the excess ammonia may be oxidized to nitrogen by the catalyst according to embodiments of the present invention.

The following examples are intended to illustrate, but not to limit, the scope of the invention. It is to be understood that other procedures known to those skilled in the art may alternatively be used.

Example 1

Synergy Between a Manganese First Component and a Cerium Second Component

The catalysts with the compositions shown in Table 1 were prepared and tested for ammonia SCR reduction of nitrogen oxides. The weight percentages of manganese and cerium are given on the basis of both the oxide and the metal, where the weight percentages on the basis of the metal are in parentheses in the Table.

TABLE 1

Compositions of Mn and Ce Catalysts

| Catalyst No. | Wt % $Mn_2O_3$ (Mn) | Wt % $CeO_2$ (Ce) | Wt % Zeolite | Wt % OSM |
|---|---|---|---|---|
| 1 | 8.8 (6.1) | 0 | 45.6 | 45.6 |
| 2 | 0 | 13.5 (11) | 43.25 | 43.25 |
| 3 | 7.7 (5.4) | 12.3 (10) | 40 | 40 |

The zeolite and OSM were placed on the substrate as a washcoat at a loading of about 150 g/L. The washcoat was dried at room temperature and then calcined at 550° C. for 4 hours. Aqueous solutions of manganese nitrate and cerium nitrate were combined and impregnated into the washcoat on the substrate. The catalysts were dried and calcined at 550° C. for 2 hours The catalysts in Table 1 were tested as fresh catalysts and after hydrothermal aging in air containing approximately 10% water vapor at 750° C. for 20 hours.

Figure 1:
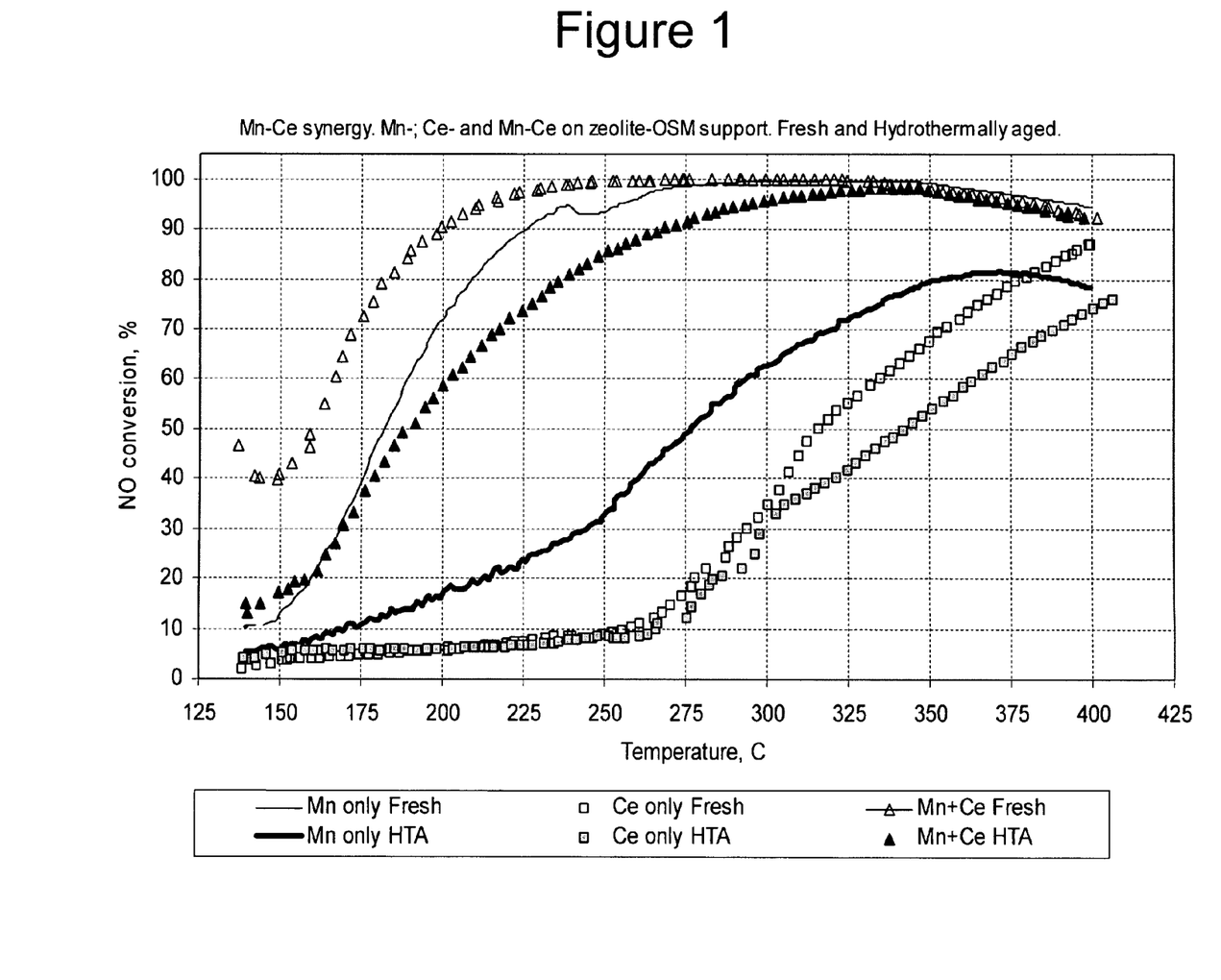
FIG. 1 is a plot showing the percent NO conversion versus temperature in degrees Centigrade, before and after hydrothermal aging, for a catalyst that contains manganese, a catalyst that contains cerium, and a catalyst that contains cerium as a first component and manganese as a second component.

The catalysts were tested for selective catalytic reduction of $NO_x$ with an inlet gas composition of 350 ppm NO, 350 ppm $NH_3$, 5% $CO_2$, 50 ppm $C_3H_6$, 14% $O_2$, 10% $H_2O$, with the balance $N_2$. The space velocity was 30,000 $hr^{-1}$. The temperature was increased from 140 to 400° C. at 20° C./min. FIG. 1 shows graphs of the percent NO conversion versus temperature in ° C. for catalysts that contained manganese but no cerium (Catalyst 1), cerium but no manganese (Catalyst 2), and both manganese and cerium (Catalyst 3). The catalysts were tested as fresh catalysts and after hydrothermal aging.

As shown in FIG. 1, the fresh Mn/Ce catalyst (Catalyst 3) had higher NO conversion activity than the fresh Mn catalyst (Catalyst 1) over at least most of the temperature range. The fresh Mn catalyst (Catalyst 1) in turn had higher NO conversion activity than the fresh Ce catalyst (Catalyst 2).

The activity of all three catalysts declined after hydrothermal aging. The activity of Catalyst 1 with Mn alone declined far more with hydrothermal aging than did the activity of the Mn/Ce catalyst (Catalyst 3), a catalyst according to embodiments of the present invention. Although the decline in activity for the Ce catalyst (Catalyst 2) on hydrothermal aging was moderate, the activity of the fresh Ce catalyst was far lower than the activity of the other two fresh catalysts. The hydrothermally aged Ce catalyst had the lowest activity of any of the catalysts in FIG. 1.

Catalyst 3, with manganese as a first component and cerium as a second component, a catalyst according to embodiments of the present invention, had significantly higher activity than Catalyst 1 with manganese as a first component and Catalyst 2 with cerium as a second component, respectively. The mixed Mn/Ce catalyst, Catalyst 3, was more stable toward hydrothermal aging than either the Mn catalyst or the Ce catalyst.

The activity of the mixed Mn/Ce catalyst, a catalyst according to an embodiment of the present invention, was higher than the activities of the single component catalysts, both when fresh and after aging. The Mn first component and the Ce second component have a synergistic effect on each other.

Example 2

Effects of NO and $NO/NO_2$ Feed Gases on Iron Beta SCR Activity

Iron-exchanged zeolite beta was supplied by Tricat GmbH, Bitterfeld, Germany.

Catalyst 4, with the composition shown in Table 2, was prepared with the iron-exchanged Beta zeolite.

TABLE 2

Composition of Iron-Exchanged Beta Catalyst

| Catalyst No. | Wt % Iron-exchanged zeolite beta | Wt % OSM |
|---|---|---|
| 4 | 50 | 50 |

Figure 2:
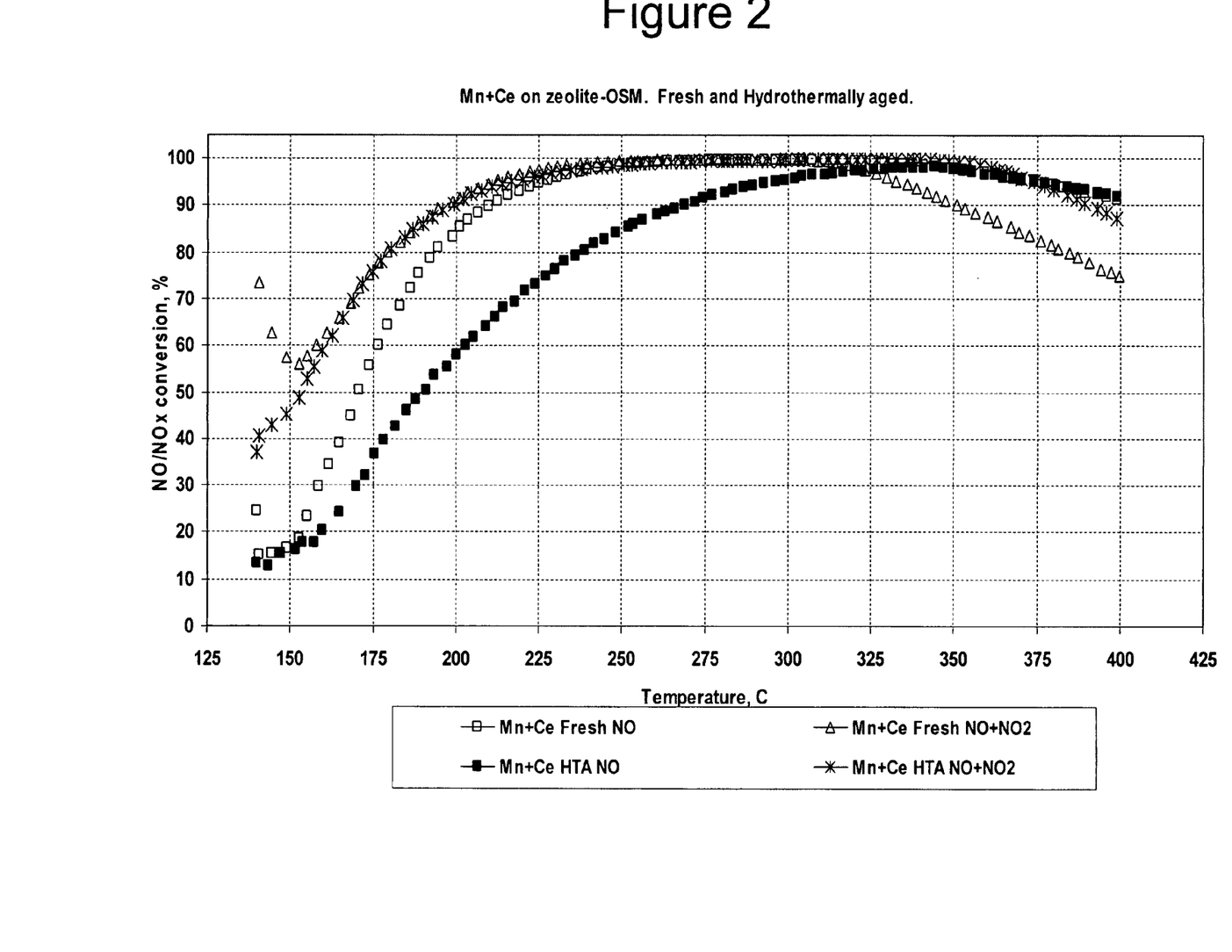
FIG. 2 is a plot showing the percent NO or $NO_x$ conversion versus temperature in degrees Centigrade for a fresh and a hydrothermally aged iron-exchanged zeolite beta catalyst with a first feed gas that contains NO and with a second feed gas that contains both NO and $NO_2$.

Catalyst 4 was tested as a fresh catalyst and after hydrothermal aging with two different feed gases. The first feed gas contained 350 ppm NO with no $NO_2$. The second feed gas contained a mixture of 175 ppm NO and 175 ppm $NO_2$. Plots of $NO/NO_x$ conversion versus temperature for both feed gases are shown in FIG. 2.

Hydrothermal aging had little effect on the activity of Catalyst 4 with either the mixed $NO/NO_2$ feed gas or the feed gas that contained only NO.

The activities of both the fresh and the hydrothermally aged Catalyst 4 with the feed gas that contained NO but no $NO_2$ were far lower than the catalyst activities with the mixed $NO/NO_2$ feed gas. The NO conversions with the NO feed gas at 200° C. for the fresh and hydrothermally aged Catalyst 4 were only about 14% and 11%, respectively, compared to about 84% and about 89% for the fresh and aged catalyst with the mixed $NO/NO_2$ feed gas. The iron/zeolite-Catalyst 4 was not effective at $NO_x$ conversion when the feed gas contained NO with no $NO_2$. Diesel exhaust normally has a high $NO/NO_2$ ratio. The iron/zeolite catalyst may therefore be expected to have low activity for SCR $NO_x$ conversion in diesel service.

Example 3

Effects of NO and $NO/NO_2$ Feed Gases on Mn/Ce/Zeolite/OSM Catalyst Activity

Catalyst 3, the Mn/Ce/zeolite/OSM catalyst, a catalyst according to an embodiment of the present invention, was tested for SCR activity in Example 3 with NO and $NO/NO_2$ feed streams in the same manner as was the Fe/Zeolite beta catalyst, Catalyst 4, in Example 2. The catalyst was tested as a fresh catalyst and after hydrothermal aging. The results are shown graphically in FIG. 3.

Figure 3:
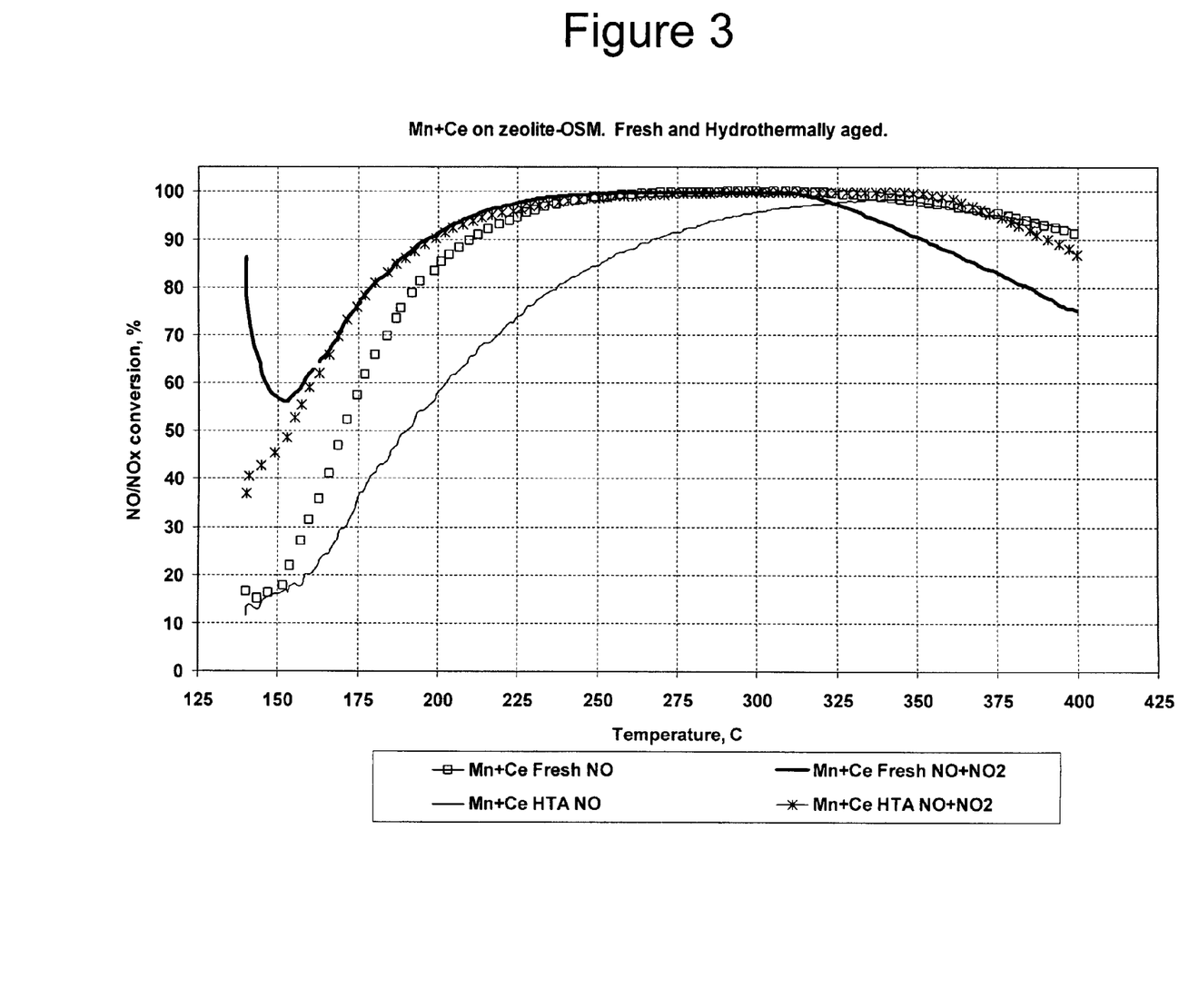
FIG. 3 is a plot showing the percent NO or $NO_x$ conversion versus temperature in degrees Centigrade for fresh and hydrothermally aged catalysts having manganese as first component and cerium as a second component with a first feed gas that contains NO and with a second feed gas that contains both NO and $NO_2$.

The $NO_x$ conversion activities for the fresh and hydrothermally aged Catalyst 3 with the mixed $NO/NO_2$ feed gas were essentially the same.

The NO conversions of the fresh and hydrothermally aged Mn/Ce catalyst with the feed stream that contained NO but no $NO_2$ were lower than the corresponding activities with the mixed $NO/NO_2$ feed stream. However, the conversion differences between the mixed $NO/NO_2$ feed stream and the pure NO feed stream for the Mn/Ce/zeolite/OSM catalyst, Catalyst 3, were not nearly as great as for the Fe/Zeolite-beta catalyst, Catalyst 4 of Example 2. The activity comparison between the Catalyst 3 and Catalyst 4 with the feed gas that contained NO but no $NO_2$ is shown in more detail in Example 4.

Example 4

Figure 4:
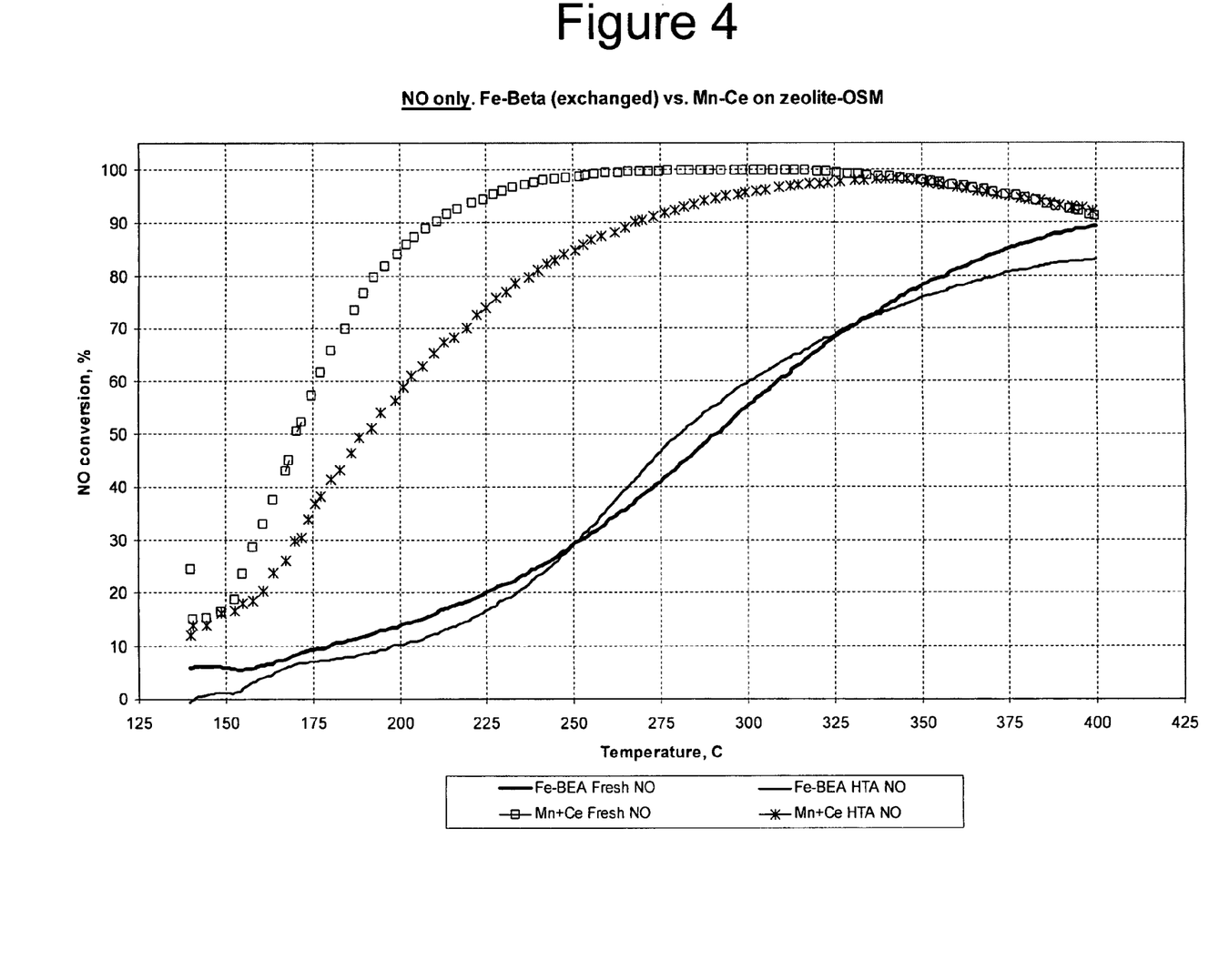
FIG. 4 is a plot showing the percent NO or $NO_x$ conversion versus temperature in degrees Centigrade for a manganese-cerium catalyst and the percent conversion for an iron-exchanged zeolite beta catalyst with a first feed gas that contains NO and with a second feed gas that contains both NO and $NO_2$.

Comparison of Mn/Ce/Zeolite/OSM Catalyst with Fe/Zeolite Beta/OSM Catalyst with NO Feed Gas FIG. 4 shows a graphical comparison of the NO conversion activity of Catalyst 3, the Mn/Ce/zeolite/OSM catalyst, with that of Catalyst 4, the Fe/Zeolite beta/OSM catalyst, with a feed stream that contained NO but no $NO_2$. The graphs show the results for both fresh and hydrothermally-aged catalysts.

The Mn/Ce/zeolite/OSM catalyst, a catalyst according to embodiments of the present invention, was far more active for NO conversion with the NO feed gas than was the Fe/Zeolite beta catalyst over the entire temperature range shown in FIG. 4, both for the fresh catalyst and the hydrothermally-aged catalyst.

The NO conversions for fresh and hydrothermally aged Mn/Ce/zeolite/OSM, Catalyst 3, at a temperature of 200° C. were approximately 84% and approximately 58%, respectively, compared to approximately 14% and approximately 11% for the fresh and hydrothermally aged Fe/Zeolite beta/OSM catalyst, Catalyst 4, at the same temperature. The NO conversion activity for the iron catalyst at 200° C. with the feed stream that contained NO but not $NO_2$ was very low.

Catalyst 3, a catalyst according to embodiments of the present invention, was effective at converting NO at the low temperatures and the high $NO/NO_2$ ratios that are encountered in diesel applications. The iron/zeolite catalyst, Catalyst 4, was not effective in converting NO under these conditions.

Example 5

Figure 5:
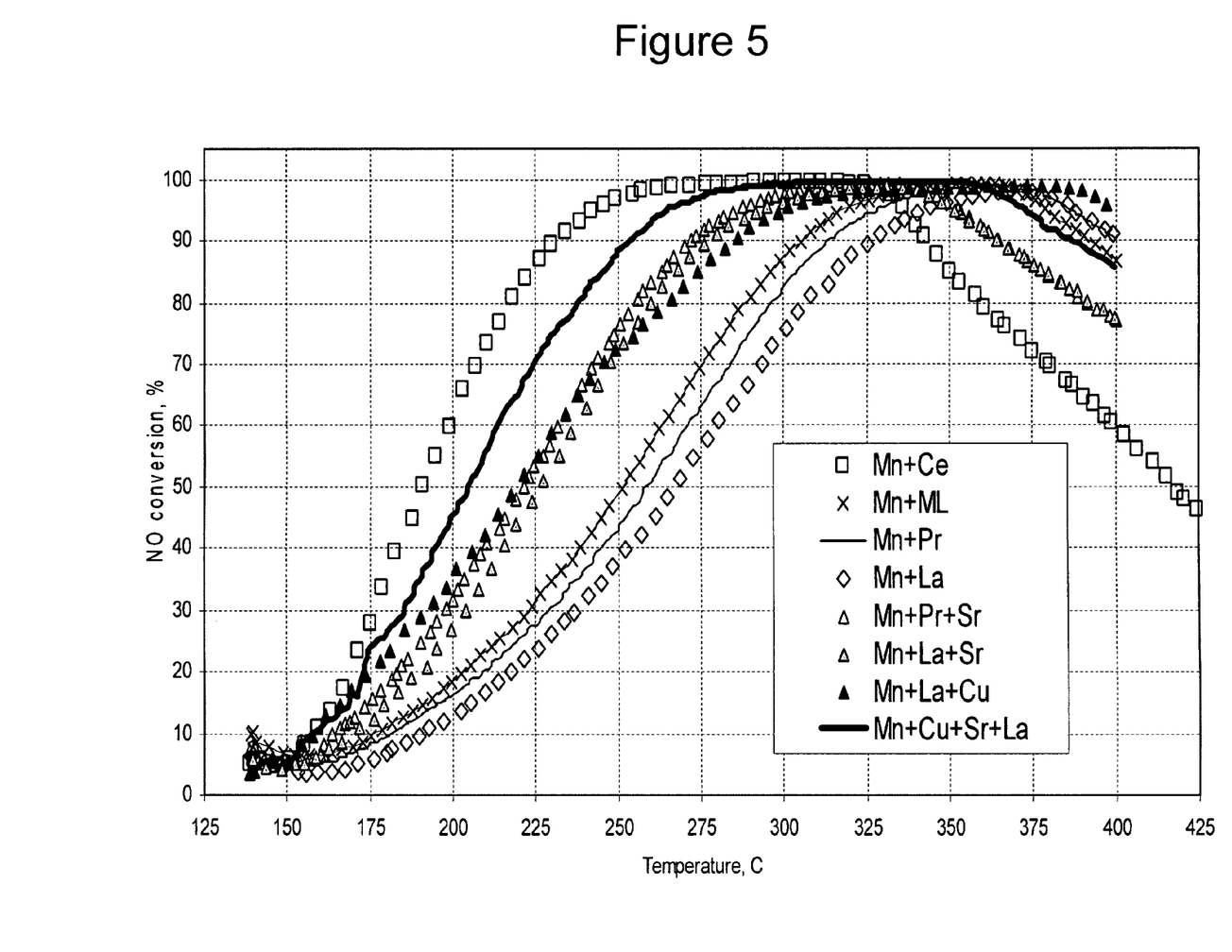
FIG. 5 is a plot comparing the percent NO conversion versus temperature in degrees Centigrade for a variety of catalysts with and without an additional strontium second component, where the catalysts were hydrothermally aged before testing.

Preparation and Testing of Catalysts with and without an Optional Strontium Second Component A series of catalysts with and without an optional strontium second component were synthesized and tested. The compositions of the catalysts are shown in Table 5 below. Plots of the percent NO conversions versus temperature after hydrothermal aging for the catalysts of Table 5 are shown in FIG. 6.

All of the catalysts contained approximately 40 wt % OSM CZLY and approximately 40 wt % zeolite, in addition to the other components. The catalysts contained approximately 7 wt % of the first component or components, approximately 13 wt % of the second component or components, and approximately 8 wt % of the strontium second component, if present, partially replacing the initial second component. All of the weight percentages are on the basis of the metal oxides. ML in Table 5 stands for a mixture of lanthanides from a mixed lanthanide nitrate solution, commercially available from Molycorp.

TABLE 3

Compositions of Catalysts With and Without Strontium Component

| Cat. No. | First Component(s) | Second Component(s) | Strontium Component? |
|---|---|---|---|
| 3 | Manganese | Cerium | No |
| 5 | Manganese, Copper | Lanthanum | No |
| 6 | Manganese, Copper | Lanthanum | Yes |
| 7 | Manganese | Lanthanum | No |
| 8 | Manganese | Lanthanum | Yes |
| 9 | Manganese | Praseodymium | No |
| 10 | Manganese | Praseodymium | Yes |
| 11 | Manganese | ML | No |

FIG. 5 shows plots of the NO conversions versus temperature in degrees Centigrade for the catalysts of Table 3. The catalysts were tested under the same conditions as for Example 1.

Catalysts 6, 8, and 10 comprised strontium as an additional second component. Catalysts 5, 7, and 9 respectively were the corresponding catalysts that did not comprise strontium as an additional second component. As shown in FIG. 5, the catalysts with strontium as an additional second component had higher NO conversion activity than the catalysts that did not comprise strontium as an additional second component over at least most of the temperature range. Catalysts that comprise strontium as an additional second component have higher NO conversion activities than the corresponding catalysts that did not comprise strontium as an additional second component.

Example 6

Preparation and Testing of Catalysts with Various First Components and Second Components A series of catalyst with the compositions shown in Table 3 are prepared and are tested for ammonia SCR activity. All of the catalysts comprise zeolite and OSM. A typical ML (without limitation) would have the composition: 7.5 wt % $PrO_x$ (where X is between about 1.5 to about 2); 63 wt % $LaO_{1.5}$; 7.5 wt % $CeO_2$ and 22 wt % $NdO_{1.5}$

TABLE 4

Compositions of Catalysts

| Catalyst No. | First Component | Second Component |
|---|---|---|
| 13 | Copper | None |
| 1 | Manganese | None |
| 14 | Iron | None |
| 15 | Niobium | None |
| 16 | Mixture of Cu, Mn, Fe, Nb | None |
| 2 | None | Cerium |
| 17 | None | Lanthanum |
| 18 | None | ML |
| 19 | None | ML and Cerium |
| 20 | Copper | Cerium |
| 21 | Copper | Lanthanum |
| 22 | Copper | ML |
| 23 | Copper | ML and Cerium |
| 3 | Manganese | Cerium |
| 7 | Manganese | Lanthanum |
| 11 | Manganese | ML |
| 12 | Manganese | Neodymium |
| 24 | Manganese | ML and Cerium |
| 25 | Iron | Cerium |
| 26 | Iron | Lanthanum |
| 27 | Iron | ML |
| 28 | Iron | ML and Cerium |
| 29 | Niobium | Cerium |
| 30 | Niobium | Lanthanum |
| 31 | Niobium | ML |
| 32 | Niobium | ML and Cerium |
| 33 | Mixture of Cu, Mn, Fe, Nb | Cerium |
| 34 | Mixture of Cu, Mn, Fe, Nb | Lanthanum |
| 35 | Mixture of Cu, Mn, Fe, Nb | ML |
| 36 | Mixture of Cu, Mn, Fe, Nb | ML and Cerium |
| 37 | Mixture of Cu, Mn | ML and Strontium |
| 38 | Mixture of Cu, Mn, Fe, Nb | ML and Strontium |
| 39 | Mixture of Cu, Mn | ML, Cerium and Strontium |
| 40 | Mixture of Cu, Mn, Fe, Nb | ML, Cerium and Strontium |
| 6 | Mixture of Cu, Mn | ML and Strontium |
| 41 | Mixture of Cu, Mn, Fe, Nb | ML and Strontium |

The catalysts are tested. The catalysts having a first component with no second component or a second component with no first component are predicted to have lower activity at low temperatures and lower hydrothermal stability than the corresponding catalysts having both a first component and a second component. Low temperature activity is important for diesel applications, because diesel exhaust is normally at low temperature. Hydrothermal stability is also important for diesel applications, because diesel exhaust contains water vapor.

The catalysts according to embodiments of the present invention have higher activity for selective reduction of $NO_x$ with ammonia than the catalysts of the prior art. Further, the catalysts according to embodiments of the present invention have high $NO_x$ conversion activity at the low temperatures and the high $NO/NO_2$ ratios that are encountered in diesel exhaust. The catalysts according to embodiments of the present invention also have high hydrothermal stability, an important factor in diesel applications.

The catalysts according to embodiments of the present invention may have applications to other gas streams that contain $NO_x$, particularly to exhaust streams that may contain high $NO/NO_2$ ratios. Some examples of applications include, but are not limited to, exhaust gas from diesel engine powered vehicles, exhaust gas from gas turbines, exhaust gas from diesel generators, exhaust gas from electrical generation plants, exhaust gas from chemical plants, and other suitable applications.

The present invention may be embodied in other specific forms without departing from its essential characteristics. The described embodiment is to be considered in all respects only as illustrative and not as restrictive. The scope of the present invention is, therefore, indicated by the appended claims rather than by the foregoing description. All changes which come within the meaning and range of the equivalence of the claims are to be embraced within their scope.

What is claimed is:

1. A catalyst for selective catalytic reduction of nitrogen oxides with ammonia, the catalyst comprising:
    a first component comprising at least one selected from the group consisting of copper, chromium, cobalt, nickel, manganese, iron, niobium, and mixtures thereof;
    a second component comprising at least one selected from the group consisting of cerium, a lanthanide, a mixture of lanthanides, and mixtures thereof; and
    at least one unexchanged zeolite.

2. The catalyst of claim 1, wherein the catalyst comprises approximately 1 to approximately 20 weight percent of the first component, approximately 2 to approximately 35 weight percent of the second component, and approximately 10 to approximately 90 weight % of the at least one zeolite, wherein the weight percentages of the first component and the second component are on the basis of the metals.

3. The catalyst of claim 1, wherein the zeolite is selected from the group consisting of ZSM-5, ZSM-11, ZSM-12, ZSM-18, ZSM-23, MCM-zeolites, mordenite, faujasite, ferrierite, zeolite beta, and mixtures thereof.

4. The catalyst of claim 1, wherein the first component is manganese, the second component is cerium, and the zeolite is ZSM-5.

5. A catalyst composition comprising:
    a substrate; and
    a catalyst for selective catalytic reduction of nitrogen oxides with ammonia, the catalyst comprising:
    a first component comprising at least one selected from the group consisting of copper, chromium, cobalt, nickel, manganese, iron, niobium, and mixtures thereof;
    a second component comprising at least one selected from the group consisting of cerium, a lanthanide, a mixture of lanthanides, and mixtures thereof; and
    at least one unexchanged zeolite, wherein the catalyst is placed on the substrate.

6. The catalyst composition of claim 5, further comprising at least one inorganic oxide selected from the group consisting of alumina, silica, titania, and silica-alumina solutions, composites, and mixtures thereof.

7. A method for selective reduction of nitrogen oxides in a gas stream with ammonia, wherein the gas stream comprises nitrogen oxides, the method comprising:
contacting the gas stream with ammonia in the presence of a catalyst, the catalyst comprising:
a first component comprising at least one selected from the group consisting of copper, chromium, cobalt, nickel, manganese, iron, niobium, and mixtures thereof;
a second component comprising at least one selected from the group consisting of cerium, a lanthanide, a mixture of lanthanides, and mixtures thereof; and
at least one unexchanged zeolite.

8. The method of claim 7, wherein the gas stream is contacted with ammonia at a temperature of approximately 140 to approximately 700 degrees Centigrade and has an ammonia/$NO_x$ mole ratio of approximately 0.6 to approximately 2.0.

9. The method of claim 7, wherein the catalyst comprises approximately 1 to approximately 20 weight percent of the first component, approximately 2 to approximately 35 weight percent of the second component, and approximately 10 to approximately 90 weight % of the at least one zeolite, wherein the weight percentages of the first component and the second component are on the basis of the metals.

10. The method of claim 7, wherein the zeolite is selected from the group consisting of ZSM-5, ZSM-11, ZSM-12, ZSM-18, ZSM-23, MCM-zeolites, mordenite, faujasite, ferrierite, zeolite beta, and mixtures thereof.

11. The method of claim 7, wherein the first component is manganese, the second component is cerium, and the zeolite is ZSM-5.

12. The method of claim 7, further comprising contacting the gas stream and ammonia with at least one inorganic oxide selected from the group consisting of alumina, silica, titania, and silica-alumina solutions, composites, and mixtures thereof.

* * * * *